United States Patent
Kalgutkar et al.

(10) Patent No.: US 10,138,367 B2
(45) Date of Patent: Nov. 27, 2018

(54) COPOLYMERS OF POLY(ETHYLENE-CO-ACRYLIC ACID) AND POLYDIORGANOSILOXANES

(71) Applicant: 3M INNOVATIVE PROPERTIES COMPANY, Saint Paul, MN (US)

(72) Inventors: Rajdeep S. Kalgutkar, Woodbury, MN (US); Joseph A. Severance, Saint Paul, MN (US); David S. Hays, Woodbury, MN (US); Alexander J. Kugel, Woodbury, MN (US); Eugene H. Carlson, Apple Valley, MN (US)

(73) Assignee: 3M Innovative Properties Company, St. Paul, MN (US)

(\*) Notice: Subject to any disclaimer, the term of this patent is extended or adjusted under 35 U.S.C. 154(b) by 0 days.

(21) Appl. No.: 15/304,184

(22) PCT Filed: Apr. 21, 2015

(86) PCT No.: PCT/US2015/026899
§ 371 (c)(1),
(2) Date: Oct. 14, 2016

(87) PCT Pub. No.: WO2015/167870
PCT Pub. Date: Nov. 5, 2015

(65) Prior Publication Data
US 2017/0044324 A1    Feb. 16, 2017

Related U.S. Application Data

(60) Provisional application No. 61/985,866, filed on Apr. 29, 2014.

(51) Int. Cl.
| | | |
|---|---|---|
| *C08L 51/06* | (2006.01) | |
| *C08L 33/08* | (2006.01) | |
| *C08G 81/02* | (2006.01) | |
| *C08L 33/00* | (2006.01) | |
| *C08L 83/08* | (2006.01) | |
| *C09D 123/08* | (2006.01) | |
| *E01F 9/506* | (2016.01) | |
| *C08G 77/442* | (2006.01) | |
| *E01F 9/512* | (2016.01) | |
| *C08G 77/14* | (2006.01) | |

(52) U.S. Cl.
CPC .............. *C08L 51/06* (2013.01); *C08G 77/14* (2013.01); *C08G 77/442* (2013.01); *C08G 81/02* (2013.01); *C08L 33/00* (2013.01); *C08L 33/08* (2013.01); *C08L 83/08* (2013.01); *C09D 123/0869* (2013.01); *E01F 9/506* (2016.02); *E01F 9/512* (2016.02)

(58) Field of Classification Search
CPC ............................ C08G 77/42; C08G 81/024
See application file for complete search history.

(56) References Cited

U.S. PATENT DOCUMENTS

| | | |
|---|---|---|
| 3,043,196 A | 7/1962 | Palmquist |
| 3,171,827 A | 3/1965 | de Vries |
| 3,279,336 A | 10/1966 | Eden |
| 3,393,615 A | 7/1968 | Micheln |
| 3,523,029 A | 8/1970 | Edwin |
| 3,556,637 A | 1/1971 | Palmquist |
| 3,679,626 A | 7/1972 | Tanekusa |
| 3,874,801 A | 4/1975 | White |
| 3,890,269 A | 6/1975 | Martin |
| 3,902,666 A | 9/1975 | Ito |
| 4,117,192 A | 9/1978 | Jorgensen |
| 4,248,932 A | 2/1981 | Tung |
| 4,301,050 A | 11/1981 | Masuda |
| 4,324,711 A | 4/1982 | Tanaka |
| 4,388,359 A | 6/1983 | Ethen |
| 4,490,432 A | 12/1984 | Jordan |
| 4,564,556 A | 1/1986 | Lange |
| 4,661,577 A | 4/1987 | Jo Lane |
| 4,681,401 A | 7/1987 | Wyckoff |
| 4,758,469 A | 7/1988 | Lange |
| 4,937,127 A | 6/1990 | Haenggi |
| 4,968,750 A | 11/1990 | Eichenauer |
| 4,969,713 A | 11/1990 | Wyckoff |
| 4,988,555 A | 1/1991 | Hedblom |
| 5,026,890 A | 6/1991 | Webb |
| 5,087,148 A | 2/1992 | Wyckoff |
| 5,108,218 A | 4/1992 | Wyckoff |
| 5,139,590 A | 8/1992 | Wyckoff |
| 5,194,113 A | 3/1993 | Lasch |
| 5,214,119 A | 5/1993 | Leir |
| 5,276,122 A | 1/1994 | Aoki |
| 5,407,986 A | 4/1995 | Furukawa |

(Continued)

FOREIGN PATENT DOCUMENTS

| | | |
|---|---|---|
| EP | 0492907 | 7/1992 |
| EP | 0980395 | 2/2000 |

(Continued)

OTHER PUBLICATIONS

JP 63-101428 machine translation (no date).*
Miller, "A New Derivation of Post Gel Properties of Network Polymers", Macromolecules, vol. 9, No. 2, Mar.-Apr. 1976, pp. 206-211.
Miller, "A New Derivation of Post Gel Properties of Network Polymers", Macromolecules, vol. 9, No. 2, Mar.-Apr. 1976, pp. 199-206.

(Continued)

*Primary Examiner* — Marc S Zimmer
(74) *Attorney, Agent, or Firm* — Kent S. Kokko; Melanie G. Gover

(57) ABSTRACT

Copolymers of poly(ethylene-co-acrylic acid) and polydiorganosiloxanes, compositions comprising the same, and articles comprising the copolymers, compositions, or both.

22 Claims, No Drawings

(56) References Cited

U.S. PATENT DOCUMENTS

| | | |
|---|---|---|
| 5,461,134 A | 10/1995 | Leir |
| 5,512,650 A | 4/1996 | Leir |
| 5,557,461 A | 9/1996 | Wyckoff |
| 5,563,569 A | 10/1996 | Pellegrino |
| 5,641,835 A | 6/1997 | Smith |
| 5,643,655 A | 7/1997 | Passarino |
| 5,854,356 A * | 12/1998 | Bergstrom ............... C08F 8/42 525/101 |
| 5,942,280 A | 8/1999 | Mathers |
| 6,008,302 A | 12/1999 | Olson |
| 6,036,764 A | 3/2000 | Gooding |
| 6,217,252 B1 | 4/2001 | Tolliver |
| 6,245,700 B1 | 6/2001 | Budd |
| 6,355,759 B1 | 3/2002 | Sherman |
| 6,465,107 B1 * | 10/2002 | Kelly ................... C08F 255/00 156/329 |
| 6,503,632 B1 | 1/2003 | Hayashi |
| 6,511,739 B2 | 1/2003 | Kasai |
| 6,531,620 B2 | 3/2003 | Brader |
| 7,169,831 B2 | 1/2007 | Helland |
| 7,371,464 B2 | 5/2008 | Sherman |
| 7,501,184 B2 | 3/2009 | Lier |
| 7,513,941 B2 | 4/2009 | Frey |
| 7,524,779 B2 | 4/2009 | Frey |
| 7,915,370 B2 | 3/2011 | Sherman |
| 8,431,668 B2 | 4/2013 | Sherman |
| 2003/0051807 A1 | 3/2003 | Yamaguchi |
| 2003/0069358 A1 | 4/2003 | Helland |
| 2003/0099512 A1 | 5/2003 | Helland |
| 2004/0081820 A1 | 4/2004 | Hayashi |
| 2004/0127614 A1 | 6/2004 | Cohen |
| 2004/0120908 A1 | 7/2004 | Jiang |
| 2004/0180032 A1 | 9/2004 | Manelski |
| 2006/0079617 A1 | 4/2006 | Kappes |
| 2007/0059441 A1 | 3/2007 | Greer |
| 2007/0092635 A1 | 4/2007 | Huh |
| 2009/0010868 A1 | 1/2009 | Ilekti |
| 2010/0055374 A1 | 3/2010 | Greer |
| 2012/0154811 A1 | 6/2012 | Pokorny |
| 2012/0175566 A1 | 7/2012 | Sherman |
| 2013/0030929 A1 | 1/2013 | Bax |

FOREIGN PATENT DOCUMENTS

| | | |
|---|---|---|
| EP | 1295926 | 3/2003 |
| JP | 63-101428 A * | 5/1988 |
| JP | S63101428 | 5/1988 |
| JP | H11209619 | 8/1999 |
| WO | WO 1992-15756 | 9/1992 |
| WO | WO 1996-34030 | 10/1996 |
| WO | WO 1997-03814 | 2/1997 |
| WO | WO 2000-009811 | 2/2000 |
| WO | WO 2007-092635 | 8/2007 |
| WO | WO 2013-033302 | 3/2013 |
| WO | WO 2014-070229 | 5/2014 |

OTHER PUBLICATIONS

Dow® Product Selection Guide, Technical Information, Specialty packaging and films, pp. 4.
DuPont™ Nucrel® 699, Packaging and Industrial polymers, E.I. u Pont de Nemours and Company, Inc., pp. 3.
International Search report or PCT International Application No. PCT/US2015/026899 dated Jul. 2, 2015, 4 pages.

* cited by examiner

COPOLYMERS OF POLY(ETHYLENE-CO-ACRYLIC ACID) AND POLYDIORGANOSILOXANES

CROSS REFERENCE TO RELATED APPLICATIONS

This application is a national stage filing under 35 U.S.C. 371 of PCT/US2015/026899, filed Apr. 21, 2015, which claims the benefit of U.S. Provisional Application No. 61/985,866, filed Apr. 29, 2014, the disclosures of which are incorporated by reference in their entirety herein.

TECHNICAL FIELD

The present disclosure relates to copolymers, and particularly to copolymers of poly(ethylene-co-acrylic acid) and polydiorganosiloxanes, as well as compositions and articles comprising the same.

BACKGROUND

Poly(ethylene-co-acrylic acid) (EAA) is a known thermoplastic polymer that can adhere to various surfaces. EAA is therefore known for use as an adhesive, such as a hot-melt adhesive, or as part of an adhesive composition, such as a hot-melt adhesive composition.

SUMMARY

A copolymer can comprise at least one poly(ethylene-co-acrylic acid) segment and at least one polydiorganosiloxane segment. The copolymer can be the product a reaction product of at least one poly(ethylene-co-acrylic acid) of Formula (I) and at least one polydiorganosiloxane of Formula (II).

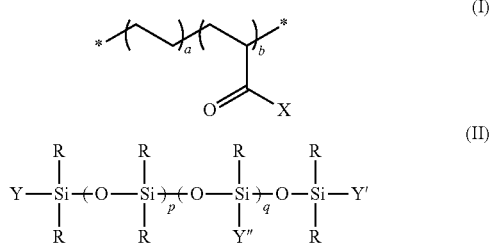

A pavement marking composition can comprise the copolymer. Other components, such as optical materials, poly(ethylene-co-acrylic acid), and the like, can also be included in the pavement marking composition. The pavement marking composition can exhibit a variety of unexpected advantages, such as increased contact angle with water.

A pavement marking tape can comprise the pavement marking composition.

A coating composition can comprise the copolymer.

An article can comprise the copolymer, the pavement marking composition, or the coating composition.

DETAILED DESCRIPTION

Throughout this disclosure, singular forms such as "a," "an," and "the" are often used for convenience; however, it should be understood that the singular forms are meant to include the plural unless the singular alone is explicitly specified or is clearly indicated by the context. Further, it should be understood that all patents, patent applications, publications, journal articles, and the like, which are mentioned in this application, are incorporated by reference in their entirety and for all purposes.

Some terms used in this application have special meanings, as defined herein. All other terms will be known to the skilled artisan, and are to be afforded the meaning that a person of skill in the art at the time of the invention would have given them.

"Pavement" and conjugations thereof, as used herein includes surfaces used for transporting people, animals, or goods, as well as related surfaces. Pavement includes roadways, walkways, bicycle paths, curbs, traffic barriers, barricades, steps, parking lots, train beds, train platforms, and other transportation-related horizontal, inclined or vertical surfaces.

"D" is an abbreviation for "Dalton," an accepted unit of molecular weight. "D" may be modified with typical prefixes to indicate orders of magnitude.

An asterisk "*" is used as part of a chemical formula for a polymer to indicate that the endgroup of the polymer is ambiguous. This is often the case in addition polymers or chain-growth polymers, such as polymerized olefinic monomers. Such endgroups may be initiator groups, quenching groups, chain transfer groups, terminating groups, hydrogen, methyl, and the like.

"Poly(ethylene-co-acrylic acid)" or "EAA" is a random copolymer containing polymerized ethylene and acrylic acid. "Poly(ethylene-co-acrylic acid)" or "EAA" also encompasses forms of the polymer where one or more of the carboxylic acid groups in the polymerized acrylic acid is activated, for example, by conversion into an acid chloride or acid bromide.

"Polydiorganosiloxane" and conjugations thereof refers to polymers having with a repeating unit of —Si—O— wherein the Si atoms, except for the terminal Si atoms, are also covalently bound to two organic moieties. Typically the two organic moieties are alkyl, alkenyl, alkynyl, aryl, aralkyl, and the like.

"Alkyl" refers to a saturated hydrocarbon substituent wherein one hydrogen atom is removed from the hydrocarbon and replaced with a covalent bond to a molecule or polymer. Alkyl groups include any $C_1$ to $C_{22}$ alkyl, such as any $C_1$ to $C_{16}$ alkyl group. An alkyl group can independently be linear, branched, or cyclic. Exemplary alkyl groups include methyl, ethyl, propyl, isopropyl, n-butyl, t-butyl, sec-butyl, iso-butyl, 2-ethyl hexyl, iso-octyl, dodecyl, hexadecyl, behenyl, and the like.

"Aryl" refers to an aromatic substituent wherein one hydrogen atom is removed and replaced with a covalent bond to a molecule or polymer. An aryl substituent can include only carbon and hydrogen or may also include one or more heteroatoms. Exemplary aryl substituents include benzyl, furanyl, naphthyl, anthracenyl, acridinyl, and the like.

"Aralkyl" refers to a substituent including an alkyl component and an aryl component, wherein one hydrogen is removed from either the aryl portion or the alkyl portion and replaced with a bond to a molecule or polymer. Exemplary aralkyl substituents include xylyl, toluenyl, and the like.

"Alkenyl" refers to an unsaturated hydrocarbon substituent having one or more carbon-carbon double bonds, wherein one hydrogen atom is removed from the hydrocarbon and replaced with a covalent bond to a molecule or polymer. Alkenyl groups include $C_4$ to $C_{22}$ monounsaturated or polyunsaturated alkenyl. Exemplary alkenyl groups include linoleyl, oleyl, myristoyl, palmitoyl, hexadicatrienyl, eicosatrienyl, eicosapentaenyl, arachidonyl, docosadienyl, adrenyl, and the like.

"Alkylene" refers to a saturated hydrocarbon substituent wherein two hydrogen atoms are removed from the hydrocarbon and each is replaced with a covalent bond to one or more molecules or polymers.

Alkylenes include any $C_1$ to $C_{22}$ alkylene, such as any $C_1$ to $C_{16}$ alkylene. Exemplary alkylene groups include methylene, ethylene, propyl, isopropylene, n-butylene, t-butylene, sec-butylene, iso-butylene, 2-ethyl hexylene, iso-octylene, dodecylene, hexadecylene, behenyene, and the like.

"Arylene" refers to an aromatic substituent wherein two hydrogen atoms are removed and each is replaced with a covalent bond to a molecule or polymer. Suitable arylenes include benzylene, furanylene, piperidylene, naphthylene, and the like.

"Aralkylene" refers to a substituent including an alkyl component and an arylcomponent, wherein a total of hydrogen atoms are removed from either the aryl portion, the alkyl portion or both and each is replaced with a bond to a molecule or polymer. Aralkylene groups include such as xylylene, toluenylene, and the like.

A copolymer can comprise at least one poly(ethylene-co-acrylic acid) (EAA) segment and at least one polydiorganosiloxane segment. Such copolymer typically has one or more blocks of EAA and one or more blocks of polydiorganosiloxane. The at least one polydiorganosiloxane segment can be covalently bound to one or more acrylic acid units in the at least one EAA segment. Any type of suitable covalent bond can be used. Most commonly, the covalent bond is an ester bond or an amide bond.

While it is possible for all of the acrylic acid units in the at least one EAA segment to be covalently bound to one of the at least one polydiorganosiloxane segments, this is not required. Typically, from 0.001 mol % to 100 mol % of the acrylic acid units are bound to a polydiorganosiloxane segment. For example, from about 0.005 mol % to about 50 mol %, or from about 0.01 mol % to about 20 mol % of the acrylic acid units in the EAA can be bound to a polydiorganosiloxane segment.

The copolymer can be the reaction product of at least one EAA of Formula (I) and at least one polydiorganosiloxane of Formula (II).

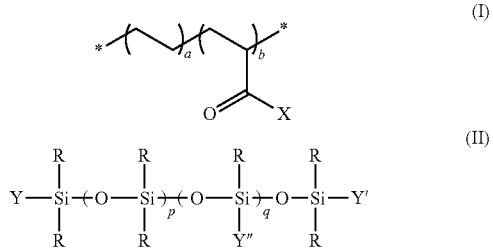

wherein:

each X is independently OH, Cl, Br, R'—NZ, or R'—O, provided that at least some occurrences of X are neither R'—NZ nor R'—O, each Y, Y', and Y" is independently selected from R, G-OH, G-O(CO)R', G-NHZ, and G-N(CO)ZR', each R is independently alkyl, aryl, or aralkyl, each R' is independently alkyl, alkenyl, aryl, or aralkyl, each G is independently alkylene, arylene, or aralkylene, each Z is independently hydrogen, alkyl, aryl, or aralkyl, a and b are both greater than zero and are selected such that 28(a)+72(b) is from about 750 to about 100,000, and p is zero or greater, and q is one or greater, and p and q are selected such that p+q is from 1 to about 12,000;

and further wherein:

at least one of Y, Y', and Y" is G-OH or G-NHZ, when either Y, Y', or both Y and Y' are not R then Y" is R, when Y" is not R then both Y and Y' are R.

The molecular weight of an EAA segment of the copolymer can be from about 750 D to about 100,000 D. The molecular weight of the polymerized acrylic acid is 72 D and the molecular weight of the polymerized ethylene is 28 D. Thus, the number of polymerized ethylene units, a, and the number of polymerized acrylate units, b, in an EAA segment can be related to a molecular weight, particularly a number average molecular weight, of an EAA segment by the formula 28(a)+72(b)=molecular weight. As such, 28(a)+72(b) can be from about 750 D to about 100,000 D, such as from about 750 D to about 50,000 D, or from about 750 D to about 10,000 D.

Similarly, the degree of polymerization of the silicone polymer of Formula (II) can be expressed as the sum of the degrees of polymerization of each of the polymerized monomers that constitute the silicone polymer. Thus, p+q can equal the total degree of polymerization of the silicone polymer of Formula (II). Values for p+q can be from about 1 to about 12,000, such as from about 5 to about 8,000, for example from about 10 to about 5,000.

For the silicone polymer of Formula (II) to react with one or more acrylic acid moiety, at least one of Y, Y', and Y" must be G-OH or G-NHZ. In many cases, a G-OH or G-NHZ group occurs at the Y, Y', or both Y and Y' locations, that is, on one or both end-groups of the silicone polymer of Formula (II). Alternatively, one of Y and Y' can be G-OH or G-NZH and the other can be G-O(CO) R' or G-NZ(CO) R'. In other cases, one or more G-OH or G-NHZ groups occurs in the center (e.g., not at and end group) of the silicone polymer of Formula (II), that is, Y" is not R but is instead G-OH or G-NZH. In such cases, the end groups can be a group that is not reactive with acrylic acid, for example, Y and Y' can both be R.

Any R can independently be any suitable alkyl group. Suitable alkyl groups include any $C_1$ to $C_{26}$ alkyl group, for example, any $C_1$ to $C_{16}$ alkyl group. Each alkyl group can independently be linear, branched, or cyclic. Exemplary alkyl groups include methyl, ethyl, propyl, isopropyl, n-butyl, t-butyl, sec-butyl, iso-butyl, 2-ethyl hexyl, iso-octyl, dodecyl, hexadecyl, behenyl, and the like.

Any R can independently be an aryl group. Exemplary aryl groups include aryl groups made of a six-membered ring, such as benzyl, furanyl, piperidinyl, and the like. Other exemplary aryl groups include aryl groups having a twelve-membered ring system, such as acenaphthenyl and the like. Also, any R can be aralkyl, such as xylyl, toluenyl, and the like.

Any R' can independently be an alkyl group. Suitable alkyl groups include any $C_1$ to $C_{22}$ alkyl, such as any $C_1$ to $C_{16}$ alkyl group. Each alkyl group can independently be linear, branched, or cyclic. Exemplary alkyl groups include methyl, ethyl, propyl, isopropyl, n-butyl, t-butyl, sec-butyl, iso-butyl, 2-ethyl hexyl, iso-octyl, dodecyl, hexadecyl, behenyl, and the like.

Any R' can independently be any alkenyl group. Suitable alkenyl groups include $C_4$ to $C_{22}$ monounsaturated or polyunsaturated alkenyl. Exemplary alkenyl groups include linoleyl, oleyl, myristoyl, palmitoyl, hexadicatrienyl, eicosatrienyl, eicosapentaenyl, arachidonyl, docosadienyl, adrenyl, and the like. Also, any R' can be aralkyl, such as xylyl, toluenyl, and the like.

Any G can independently be an alkylene group. Suitable alkylenes include any $C_1$ to $C_{22}$ alkylene, such as any $C_1$ to $C_{16}$ alkylene. Exemplary alkylene groups include methylene, ethylene, propylene, isopropylene, n-butylene, t-butylene, sec-butylene, iso-butylene, 2-ethyl hexylene, iso-octylene, dodecylene, hexadecylene, behenyene, and the like.

Any G can independently be any arylene group. Suitable arylenes include benzylene, furanylene, piperidylene, naphthylene, and the like. Also, any G can independently be an aralkylene group, such as xylylene, toluenylene, and the like.

The amine portion of any G-NZH can independently be a primary or secondary amine. When the amine portion of G-NZH is a primary amine, Z is H. When the amine portion of G-NZH is a secondary amine, Z can be alkyl, such as $C_1$ to $C_{22}$ alkyl or $C_1$ to $C_{16}$ alkyl. Alternatively, when the amine portion of G-NZH is a secondary amine, Z can be aryl, such as benzyl, furanyl, piperdyl, naphthyl, and the like.

When Y" is not R, the at least one polydiorganosiloxane can have at least one hydroxyl group, at least one amine group, or both, in the central portion of the polymer (i.e., not at an end group). Such at least one polydiorganosiloxanes can have the structure of Formula (III).

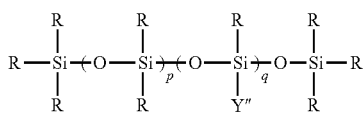
(III)

When each Y" in Formula (III) is G-OH, the polydiorganosiloxane of Formula (III) can have the structure of Formula (IV).

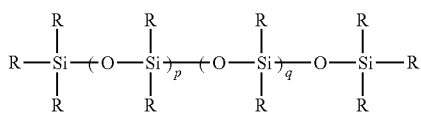
(IV)

When each Y" in Formula (III) is G-NZH, the polydiorganosiloxane of Formula (III) can have the structure of Formula (V).

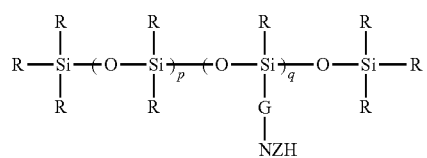
(V)

When each Y" in Formula (III) is R, there are no G-NHZ or G-OH groups in the central portion of the polydiorganosiloxane, and at least one of Y and Y' is G-OH or G-NHZ. In such cases, it is convenient to simplify Formula (III) by considering p to equal zero, which provides a polydiorganosiloxane having the structure of Formula (VI).

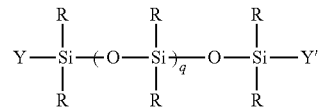
(VI)

Formula (VI) may be mono-functionalized. In such cases, Y is G-OH or G-NZH and Y' is R. As an alternative, Formula (VI) may be di-functionalized. In such cases, Y is G-OH or G-NHZ and Y' is G-OH, G-O(CO)R', G-NHZ, or G-NZ(CO)R'. Di-functional examples of Formula (VI) usually occur in one of the following combinations: (1) Y and Y' are both G-OH; (2) Y is G-OH and Y' is G-O(CO)R'; (3) Y and Y' are both G-NZH; or (4) Y is G-NZH and Y' is G-O(CO)R', although other combinations of Y and Y' are also possible.

These polydiorganosiloxanes, for example, those having the structure of Formula (II), along with methods of making the same, have been described. For example, methods of making such polymers when Y, Y', and Y" are either R or G-NZH are described in US 2013/030929, U.S. Pat. No. 3,890,269, U.S. Pat. No. 4,661,577, U.S. Pat. No. 5,026,890, U.S. Pat. No. 5,276,122, U.S. Pat. No. 5,214,119, U.S. Pat. No. 5,461,134, U.S. Pat. No. 5,512,650, and U.S. Pat. No. 6,355,759, all of which are hereby incorporated by reference in their entireties and for all purposes. Other methods of making such polydiorganosiloxanes have been described, for example, in U.S. Pat. No. 7,501,184 and WO 96/34030, both of which are hereby incorporated by reference in their entireties and for all purposes. Also, such polydiorganosiloxanes are commercially available from Shin-Etsu Chemicals (Tokyo, Japan) and Gelest (Morrisville, Pa.). Polydiorganosiloxanes wherein Y' is G-NZ(CO)R' can be synthesized by reacting some of the G-NHZ moieties with a monofunctional carboxylic acid R'—C(O)OH under amidation conditions.

Polydiorganosiloxanes, such as those of Formula (II), wherein Y, Y', and Y" are either R or G-OH are commercially available from Shin-Etsu Chemicals (Tokyo, Japan) and Gelest (Morrisville, Pa.). Polydiorganosiloxanes wherein Y' is G-O(CO)R' can be synthesized by reacting some of the G-OH moieties with a monofunctional carboxylic acid R'—C(O)OH under esterification conditions.

An EAA-polydiorganosiloxane copolymer can be formed by a reaction between the hydroxyl moiety of the one or more G-OH groups or the amine moiety of the one or more G-NZH groups on the polydiorganosiloxane with one or more of the acid groups on the EAA. The reaction can be carried out by any suitable method for forming an ester or amide from an alcohol or amine and a carboxylic acid. For example, the alcohol or amine and carboxylic acid can be combined in the presence of an inert solvent under conditions suitable for esterification or amidation.

Typical inert solvents include those that do not undergo a chemical reaction under the esterification or amidation conditions. Such solvents often lack both acidic protons and reactive functional groups such as carbonyls, carboxylic acids, alcohols, amines, and the like. Solvents that form heterogeneous azeotropic mixtures with water can be convenient, because the reaction can be driven to completion by removal of the water that is generated in the reaction, and also monitored by the collection of water in a trap. Solvents that do not form azeotropic mixtures with water can also be used, in which case it can be desirable to add a desiccant to the reaction mixture for removing water that is generated in the reaction. Exemplary solvents that can be suitable include toluene, benzene, xylene, including one or more of p-xylene, o-xylene, and m-xylene, and the like. Importantly, an inert solvent is not required unless otherwise specified because it can be possible to conduct the reaction neat. For example, acid chlorides and acid bromides (i.e., EAA of Formula (I) wherein X is Cl or Br,) are particularly reactive under neat conditions.

When the reaction is carried out in the presence of a solvent that forms a heterogeneous azeoptropic mixture, the poly(ethylene-co-acrylic acid) or the polydiorganosiloxane of Formulas (II) to (VI) do not need to be completely soluble under the reaction conditions. Surprisingly, even reactions carried out with a partially soluble poly(ethylene-co-acrylic acid) can provide very high degrees of conversion as determined by end-group titration. Thus, while the solubility of EAA in a heterogeneous azeotrope solvent may be increased by pre-reacting a portion of the acrylic acid units in EAA with an amine of Formula R'—NHZ, this is not a requirement for achieving a reaction of EAA with a polydiorganosiloxane, such as the polydiorganosiloxanes of Formulas (II) to (VI).

The esterification or amidation reaction can be carried out by any suitable procedure. A catalyst is often added to facilitate the reaction. Typical catalysts include acids and bases, such as Arrhenius acids or bases. Most commonly, mineral acids such as one or more of phosphoric acid, sulfuric acid, hydrochloric acid, and nitric acid, are used as a catalyst. Any amount of catalyst sufficient to promote the reaction can be used. Exemplary levels of catalyst range from 10 ppm to 2 wt. %. However, it should be understood that no catalyst is required unless otherwise specified, especially since it is possible that the carboxylic acid groups in the EAA can auto-catalyze the reaction.

When an inert solvent is used, it is often convenient to carry out the reaction under reflux conditions. A water trap, such as a Dean-Stark trap, can be used to capture water that is released during the reaction while returning the inert solvent back to the reaction mixture.

In order to facilitate the reaction, one or more of the acid groups on the EAA can be activated before addition of the polydiorganosiloxane. Activation can include converting one or more carboxylic acid groups of the EAA to an acid halide, such as an acid chloride or an acid bromide. This conversion can be performed by any suitable method. Suitable methods include reaction of one or more of the acrylic acid groups with thionyl chloride, thionyl bromide, phosphorous pentachloride, phosphorous pentabromide, and similar reagents.

When the polydiorganosiloxane has two or more reactive functional groups, for example, when both Y and Y' are G-OH or G-NHZ in the polydiorganosiloxane of Formula (VI), the reaction between the EAA and the polydiorganosiloxane can, in some cases, result in a gel. However, formation of a gel can be deterred by careful control of the reaction stoichiometry such as by using a low number of equivalents of a high molecular weight polydiorganosiloxane. An appropriate stoichiometry for avoiding a gel can be calculated by way of known statistical gel theory, for example, as explained in "Principles of Polymer Chemistry" by Paul Flory (Cornell University Press, Ithaca N.Y. 1953), or Christopher Macosko and Douglas Miller, *Macromolecules*, 9, 199-206 and 206-211 (1976) both of which are hereby incorporated by reference in their entireties and for all purposes.

Another way to avoid deter gel formation is to convert some of the reactive functional groups of at least one polydiorganosiloxane to non-reactive derivatives before adding the at least one polydiorganosiloxane to the EAA. For example, when both Y and Y' are G-OH or G-NHZ in the polydiorganosiloxane of Formula (VI), the polydiorganosiloxane can be reacted with one or more monofunctional carboxylic acids R'—C(O)OH or one or more amines R'—NZH under esterification or amidation conditions, such as the esterification and amidation conditions discussed herein with respect to the reaction of EAA and at least one polydiorganosiloxane. The resulting derivative can include polydiorganosiloxanes that have fewer functional groups that are reactive towards the acrylic acid units in EAA, and therefore is less likely to form a gel. For example, a polydiorganosiloxane of Formula (VI) wherein Y and Y' are G-OH or G-NHZ can be converted to a polydiorganosiloxane of Formula (VI) wherein Y is G-OH or G-NHZ and Y' is G-O(CO)R' or G-NZ(CO)R'. In such cases, the polydiorganosiloxane can be a mixture of polydorganosiloxanes with different moieties for Y and Y'.

The monofunctional carboxylic acid R'—C(O)OH or amine R'—NZH can have any suitable R'. For example R' can be one or more of alkyl, aryl, aralkyl, and alkenyl. Particular alkenyl groups include one or more of linoleyl, oleyl, myristoyl, palmitoyl, hexadicatrienyl, eicosatrienyl, eicosapentaenyl, arachidonyl, docosadienyl, and adrenyl. Particular alkyl groups include $C_1$ to $C_{22}$ alkyl. Particular aryl groups include benzyl. Particular aralkyl groups include alkylated benzyl, such as tolueyl. The resulting polydiorganosiloxane will have the same R' as the monofunctional carboxylic acid R'—C(O)OH or amine R'—NZH.

Yet another way to deter gel formation is to pre-react some of the carboxylic acid units of EAA with an amine R'—NHZ or monofunctional alcohol R'—OH to convert a predetermined number of the carboxylic acid groups to amides or esters. In such cases, some occurrences of X in Formula (I) are R'—NZ or R'—O, providing an EAA with fewer reactive carboxylic acid groups, on average, when compared to EAA that is not pre-reacted with an amine or monofunctional carboxylic acid. The pre-reacted EAA is less likely to form a gel upon reaction with a polydiorganosiloxane, for example, a polydiorganosiloxane of Formula (VI). When this approach is used, some of the carboxylic acid groups must remain unreacted with the amine to preserve the reactivity of the EAA. As such, in Formula (I) at least some occurrences of X are neither R'—NZ nor R'—O. Instead, the degree of conversion to amide or ester can be sufficient to prevent gel formation while maintaining enough carboxylic acid moieties to react with the silicone. Thus, the conversion to amide or ester can be related to the characteristics of the particular EAA being used, such as molecular weight of the EAA polymer, the ratio of acrylic acid to ethylene in the EAA polymer, and the acid number of the EAA polymer. When this approach is used, the occurrences of X that are R'—NZ, R'—O, or both often ranges from 5% to 99.9%, for example, from 10% to 99%, or from 20% to 98%.

The copolymers described herein can have many properties that make them well suited for use in pavement marking compositions. For example, the copolymers can be readily mixed into hot-melt compositions, and processed by hot-melt processes. The hot melt properties can be altered, for example, by varying the amount of acrylic acid in the EAA and by varying the molecular weight of the EAA.

The copolymers can also exhibit good adhesion characteristics to polar surfaces, such as pavement surfaces. Alternatively, if the copolymers do not exhibit good adhesion characteristics, they do not interfere with adhesion of other components of a pavement marking composition, such as rosins and tackifiers, to polar surfaces.

The copolymers can exhibit a high degree of toughness. Pavement marking compositions may be tread on by automobiles, pedestrians, bicycles, and the like, hundreds, thousands, tens of thousands, hundreds of thousands, or even more times per day. Even in view of this, the compositions can be sufficiently tough and durable to retain adhesion to the pavement over one year or more without significant changes in color or brightness. The toughness of the copolymer is advantageous because it imparts wear resistance in high traffic situations.

The copolymers can also be insoluble in most solvents, thus making them resistant to solvents, such as water, as well as dirt and grime. When incorporated into a pavement marking composition, the copolymers can increase the contact angle of water on a film of the pavement marking composition. Surprisingly, such increases can occur when only a small amount of the copolymers are added to the pavement marking composition.

A pavement marking composition can comprise any suitable amount of the one or more copolymers described herein. Typically, a pavement marking composition includes from about 0.1 wt % to about 10 wt % of one or more copolymers described herein. For example, the one or more copolymers can be present from about 1 wt % to about 7 wt %, or from about 2 wt % to about 5 wt %, of the pavement marking composition. However, more or less can be also used depending on the other components of the pavement marking composition, the intended use, and other factors determined by the artisan.

Additional components can also be included in a pavement marking composition. For example, the pavement marking composition can comprise one or more EAA polymers. The EAA polymers can have a number average molecular weight from about 750 D to about 100,000 D, such as from about 750 D to about 50,000 D, or from about 750 D to about 10,000 D. Such EAA is commercially available, for example, under the names PRIMACOR 59901 (Dow Chemical Company) and A-C 5120 (Honeywell). The acrylic acid content of either EAA polymer can be from about 1.5 wt % to about 55 wt %, such as about 3 wt % to about 20 wt % or about 5 wt % to about 15 wt %. The pavement marking composition can include from about 1.5 wt % and about 55 wt % of the EAA polymer with a number average molecular weight between about $1.0 \times 10^4$ D to about $1.0 \times 10^5$ D and from about 5 wt % to about 72 wt % of the EAA with a number average molecular weight between about 1500 D and about 5000 D.

Additional polymers can be added to a pavement marking composition to further improve one or more of durability, toughness, dirt resistance, and adhesion. Examples of additional polymers include one or more of, acrylic polymers and copolymers, olefin polymers and copolymers, olefin block copolymers, thermoplastic urethane polymers and copolymers, ester polymers and copolymers, and polyamide polymers and copolymers.

Exemplary acrylic polymers and copolymers include, for example, those that contain repeating units derivable from acrylic acid or methacrylic acid, and include polymers of monomers such as methyl methacrylate, ethyl methacrylate, n-butyl acrylate, n-butyl methacrylate, ethyl hexyl acrylate, hydroxyethyl acrylate, hydroxyethyl methacrylate, acrylic acid, methacrylic acid, styrene, methyl styrene and glycidyl acrylate. Commercially available versions of such acrylic polymers and copolymers include, for example, JONCRYL SCX-815, -817 and -819 carboxylfunctional acrylic resins (commercially available from SC Johnson Polymer), ELVACITE grades 2008, 2013, 2016, 2028, and 2043 methacrylate resins (commercially available from ICI Acrylics), and ACRYLOID B-66 methyl/butyl methacrylate polymer (commercially available from Rohm & Haas).

Exemplary olefin polymers and copolymers include, for example, non-grease, non-wax materials containing repeating units derivable from olefinic monomers, and include ethylene acrylic acid copolymers, ethylene methacrylic acid copolymers (including ionically-crosslinkable ethylene methacrylic acid copolymers), polyethylene plastics, polypropylene, ethylenepropylene-diene terpolymers, polybutylene, ethylene n-butyl acrylate, ethylene maleic anhydride copolymers, ethylene vinyl acetate, and ethylene methyl acrylate and ethylene ethyl acrylate copolymers). Commercially available versions of such olefin polymers and copolymers include, for example, NUCREL ethylene methacrylic acid copolymers, SURLYN ionically-crosslinkable ethylene methacrylic acid copolymer and ELVALOY AM ethylene/glycidyl/acrylate terpolymers (all commercially available from E. I. duPont de Nemours), and A-C 573A ethylene-maleic anhydride copolymer (commercially available from Honeywell International Inc.), Infuse olefin block copolymer (commercially available from The Dow Chemical Co.)

Exemplary urethane polymers and copolymers include, for example, those containing repeating urethane linkages and aromatic or aliphatic groups or segments. Where weatherability is desired, aliphatic (and preferably cycloaliphatic) groups or segments may be preferred. Industrially available urethane polymers and copolymers include L-430. Commercially available versions of such urethane polymers and copolymers include, for example, 77-3 and -4 thermoplastic polyurethanes (experimentally available from Morton International, Inc.)

Exemplary epoxy resins include, for example, those that contain epoxy groups and aromatic or aliphatic groups or segments. Where weatherability is desired, aliphatic (and preferably cycloaliphatic) groups or segments may be preferred. Commercially available curable epoxy resins include, for example, SCOTCHKOTE 413 fusion-bonded epoxy coating material (commercially available from 3M Company), and EPON 1001F aromatic solid epoxy resin (commercially available from Shell Chemical Co.)

Exemplary ester polymers include, for example, those that contain repeating ester units and aromatic or aliphatic groups or segments. The ester polymer or copolymer can be a linear, non-crosslinkable material. Commercially available ester polymers and copolymers include, for example, those described in U.S. Pat. No. 6,217,252 (Tolliver), which is hereby incorporated by reference in its entirety and for all purposes. A variety of polyester resins can be employed, from suppliers such as Bostic Chemicals, Eastman Chemical Company, DSM Resins US, Inc., Hoechst, McWhorter Technologies, Inc., Reichhold Chemicals, Inc., Ruco Polymer Corp., and UCB Chemicals Corp.

Exemplary commercially available polyamides and co-polyamides include, for example, Eurelon 930, 931, 940 and 961, Versamide 900 and 930 (available from Huntsman Advanced Materials Americas Inc. and BASF Corporation.)

Pavement marking compositions can include white ceramic microspheres. The white ceramic microspheres, when they are used can be present in any suitable quantity, typically no more than 85 wt %, such as from about 25 wt % to about 45 wt %, or from about 30 wt % to about 42 wt %. Importantly, other amounts of white ceramic microspheres can also be used, depending on the desired properties or application of the product.

Pavement markings compositions can include one or more optical components. Exemplary optical components include, for example, transparent microspheres (i.e., beads), optical elements, and combinations thereof. The optical components can have any shape, depending on the desired optical properties. Spheroidal shapes are most common. Exemplary transparent microspheres include those having a refractive index between about 1.4 and about 2.6. Exemplary transparent microspheres include, for example, glass beads having a refractive index between about 1.4 to about 2.26, and transparent, solid microspheres such as those disclosed in U.S. Pat. No. 6,245,700 (Budd), U.S. Pat. No. 6,511,739 (Kasai), U.S. Pat. No. 7,524,779 (Frey), and U.S. Pat. No. 7,513,941 (Frey), all of which are hereby incorporated by reference in their entirety and for all purposes. Exemplary glass beads include those disclosed in U.S. Pat. No. 4,564,556 (Lange) and U.S. Pat. No. 4,758,469 (Lange), all of which are hereby incorporated by reference in their entirety and for all purposes. These glass beads can be generically described as solid, transparent, non-vitreous, ceramic spheroids having at least one metal oxide phase.

Further exemplary optical components for use in the compositions and articles of the present application include those having a refractive index between about 1.5 and about 2.4. These optical components can include aggregates (i.e., a polymer matrix with transparent spheres and/or bonded core elements dispersed therein) and bonded core elements (i.e., materials having a core and a plurality of transparent spheres adhered to the core) such as, for example, those described in U.S. Pat. No. 5,942,280 (Mathers), U.S. Pat. No. 3,043,196 (Palmquist, et al.), U.S. Pat. No. 3,556,637 (Palmquist, et al.), and U.S. Pat. No. 3,171,827 (de Vries, et al.) all of which are hereby incorporated by reference in their entirety and for all purposes.

The pavement marking compositions can comprise plasticizer. Suitable plasticizers include, for example, dicarboxylic or tricarboxylic ester-based plasticizers such as dimethyl phthalate, bis(2-ethylhexyl) phthalate (DEHP), diisononyl phthalate (DINP), bis(n-butyl)phthalate (DnBP, DBP), butyl benzyl phthalate (BBzP) diisodecyl phthalate (DIDP), di-n-octyl phthalate (DOP or DnOP), di-n-nonyl phthalate, di-n-undecyl phthalate, diundecyl phthalate, di-n-hexyl phthalate, di-n-heptyl phthalate, ditridecyl phthalate, undecyldodecyl phthalate, di(2-propylheptyl phthalate), nonylundecyl phthalate, alkylbenzyl phthalate, C7-C9 butyl phthalate, texanolbenzylphthalate, polyester phthalate, diallylphthalate, n-butylphthalyl-n-butyl glycosate, dicaprylphthalate, butylcyclohexyl phthalate, dicyclohexyl phthalate or butyl octyl phthalate, diisooctyl phthalate (DIOP), diethyl phthalate (DEP), diisobutyl phthalate (DIBP); trimellitates such as trimethyl trimellitate (TMTM), trioctyl trimellitate, triisooctyl trimellitate, tri isononyl trimellitate, triisodecyl trimellitate, tri-n-hexyl trimellitate, tri-(2-ethylhexyl) trimellitate (TEHTM-MG), tri-(n-octyl,n-decyl) trimellitate (ATM), tri-(heptyl,nonyl) trimellitate (LTM), n-octyl trimellitate (OTM); adipates, sebacates, glutarates, azelates or maleates such as bis(2-ethylhexyl)adipate (DEHA), dimethyl adipate (DMAD), monomethyl adipate (MMAD), diisonyl adipate, diisooctyl adipate, diisodecyl adipate, di tridecyl adipate, dibutoxyethyl adipate, dibutoxyethoxy adipate, di(n-octyl, undecyl)adipate, polyester adipate, poly glycol adipates, dioctyl adipate (DOA), dioctyl azelate, di-2-ethylhexyl glutarate, di-2-ethyl hexyl sebecate, dibutoxyethyl sebecate, dibutyl sebacate (DBS), dibutyl maleate (DBM), diisobutyl maleate (DIBM); benzoates such as isodecyl benzoate, diethylene glycol dibenzoate, dipropylene glycol dibenzoate, triethylene glycol dibenzoate 1,4 cyclohexane dimethanol dibenzoate, 2,2,4 trimethyl-1,3 pentane diol dibenzoate, 2-ethylhexyl benzoate, C9 benzoates, C10 benzoates, texanolbenzoate, ethylene glycol dibenzoate, propylene glycol dibenzoate, triethylene glycol dibenzoate, 2,2,-dimethyl-1,3 propanediol dibenzoate, pentaerythritol tetrabenzoate, glycerol tribenzoate, polypropylene glycol dibenzoate; epoxidized vegetable oils; sulfonamides such as N-ethyl toluene sulfonamide (o/p ETSA), ortho and para isomers, N-(2-hydroxypropyl) benzene sulfonamide (HP BSA), N-(n-butyl) benzene sulfonamide (BBSA-NBBS); organophosphates such as tricresyl phosphate (TCP), triarylphosphates, tributyl phosphate (TBP); glycols or polyethers such as triethylene glycol dihexanoate (3G6, 3GH), tetraethylene glycol diheptanoate (4G7), glycerol triacetate (triacetin); polymeric plasticizers; polybutene; or biodegradable plasticizers such as acetylated monoglycerides; alkyl citrates such as triethyl citrate (TEC), acetyl triethyl citrate (ATEC), tributyl citrate (TBC), acetyl tributyl citrate (ATBC), trioctyl citrate (TOC), acetyl trioctyl citrate (ATOC), trihexyl citrate (THC), acetyl trihexyl citrate (ATHC), butyryl trihexyl citrate (BTHC, trihexyl o-butyryl citrate), trimethyl citrate (TMC), C10-C21 alkane phenol esters or alkyl sulphonic acid phenyl ester (ASE), acetic acid reaction products with fully hardened castor oil, diisononyl cyclohexane 1,2 dicarboxylate, polymers of adipic acid/phthalates/adipates/sebecates/with glycols and often acid terminated, 2,2,4-trimethyl-1,3-pentanediol diisobutyrate, and 1,2-Cyclohexane dicarboxylic acid diisononyl ester. Any of these plasticizers, or other plasticizers not listed, can be used salone or in any suitable combination.

Examples of useful commercially available plasticizers include, for example, MESAMOLL available from Lanxess, Pittsburgh, Pa.; RHODIASOLV IRIS available from Rhodia, Bristol, Pa.; EASTMAN 168 available from Eastman Chemical, Kingsport, Tenn.; and PRIFER 6813 available from Croda USA, Edison, N.J.

When plasticizer is used, it can be used in any suitable amount, for example from about 0.1 wt % to about 3 wt % or from about 0.1 wt % to about 4 wt % plasticizer.

Pavement marking compositions can comprise a wax such as, for example, a polyethylene or a polypropylene wax to improve film properties and application properties. Natural waxes like bee's wax, paraffin, carnauba wax and montan wax as well as other synthetic waxes can also be utilized. Useful waxes typically have an average molecular weight of about 450 g/mole to about 3000 g/mole.

When a wax is used, it can be present in any suitable amount, for example, from about 1 wt. % to about 5 wt %, or from about 1 wt % to about 10 wt. % of the pavement marking composition.

Pavement marking compositions can comprise one or more of whitening agents, dye particles, colorants and pigments.

Examples of useful pigments include Halogenated copper phthalocyanines, Aniline Blacks, Anthraquinone blacks, Benzimidazolones, Azo condensations, Arylamides, Diarylides, Disazo condensations, Isoindolinones, Isoindolines, Quinophthalones, Anthrapyrimidines, Flavanthrones, Pyrazolone oranges, Perinone oranges, Beta-naphthols, BON arylamides, Quinacridones, Perylenes, Anthraquinones, Dibromanthrones, Pyranthrones, Diketopyrrolo-pyrrole pigments (DPP), Dioxazine violets, Copper & Copper-free phthalocyanines, Indanthrones, and the like.

Examples of useful inorganic pigments include Titanium dioxide, Zinc oxide, Zinc sulphide, Lithopone, Antimony oxide, Barium sulfate, Carbon Black, Graphite, Black Iron Oxide, Black Micaceous Iron Oxide, Brown Iron oxides, Metal complex browns, Lead chromate, Cadmium yellow, Yellow oxides, Bismuth vanadate, Lead chromate, Lead molybdate, Cadmium red, Red iron oxide, Prussian blue, Ultramarine, Cobalt blue, Chrome green (Brunswick green), Chromium oxide, Hydrated chromium oxide, Organic metal complexes, laked dye pigments, and the like.

Exemplary whitening agents include, for example, $TiO_2$, barium sulfate, and zinc oxide. In embodiments including $TiO_2$, the composition may include, for example, from about 0.1 wt % to about 15 wt %, or about 0.1 wt % to about 10 wt %, or about 0.01 wt % to about 5 wt %, or about 0.5 wt % to about 15 wt %, or about 0.5 wt % to about 10 wt %, or about 0.5 wt % to about 5 wt %, $TiO_2$ based on the total weight of the pavement marking composition.

The pavement compositions of the invention comprise a whitening agent or a yellow pigment. For example, a pavement marking composition can comprise from about 0.5 wt. % to about 2.5 wt. % yellow pigment. Such composition can be useful for making yellow markings, such as one or more of yellow lines, broken yellow lines, and double yellow lines, on pavement.

The pavement marking composition can comprise one or more fillers. Fillers are typically solids that are non-reactive with the other components of the pavement marking composition. Such fillers include, for example, one or more of clay, talc, glass particles (e.g., frit or fibers), glass beads, metal oxide particles, silica particles, ceramic microspheres, hollow polymeric microspheres (such as those available under the trade designation EXPANCEL 551 DE from Akzo Nobel, Duluth, Ga.), hollow glass microspheres (such as those available under the trade designation K37 from 3M Co., St Paul, Minn.), carbonates, metal oxides, silicates (e.g. talc, asbestos, clays, mica), sulfates, silicon dioxide, and aluminum trihydrate.

Some specific examples of fillers include one or more of ground or light calcium carbonate (with or without a surface-treatment such as a fatty acid, resin acid, cationic surfactant, or anionic surfactant); magnesium carbonate; talc; sulfates such as barium sulfate; alumina; metals in powder form (e.g., aluminum, zinc and iron); bentonite; kaolin clay; and quartz powder.

The one or more fillers can also comprise conductive particles (see, for example, U.S. Patent Application Pub. No. 2003/0051807) such as carbon particles or metal particles of silver, copper, nickel, gold, tin, zinc, platinum, palladium, iron, tungsten, molybdenum, solder or the like, or particles prepared by covering the surface of these particles with a conductive coating of a metal or the like. Non-conductive particles of a polymer such as polyethylene, polystyrene, phenol resin, epoxy resin, acryl resin or benzoguanamine resin, or glass beads, silica, graphite or a ceramic, whose surfaces have been covered with a conductive coating of a metal or the like, can also be used as conducting particles.

For particular applications, inorganic solids such as, for example, one or more of talc, silica, zirconia, calcium carbonate, calcium magnesium carbonate, glass microspheres and ceramic microspheres can be used as fillers. In some applications, calcium carbonate is particularly useful.

The pavement marking compositions can comprise one or more of a C5 hydrocarbon resin, a resin comprising rosin acids, rosin esters, modified rosin acids, modified rosin esters or mixtures thereof. When used, these resins or rosins can be present in any suitable amount, for example from about 5 wt % to about 20 wt %, about 5 wt % to about 25 wt %, about 10 wt. % to about 20 wt %, or about 10 wt % to about 25 wt %.

C5 hydrocarbon resins can be produced from C5 piperylenes, which can be the by-product of naphtha cracking. Liquid C5 piperylene feedstock can be polymerized to form a C5 hydrocarbon resin. C5 hydrocarbon resins are predominately aliphatic materials, but the structure of the resin is difficult to characterize because various isomers of the feedstock can combine unpredictably. C5 hydrocarbon resins can be hydrogenated to improve stability and other properties, but are also commonly used without hydrogenation.

Examples of commercially available C5 hydrocarbon resins include PICCOTAC aliphatic hydrocarbon resins and EASTOTAC hydrogenated aliphatic resins such as EASTOTAC H-100E and H-100R, available from Eastman Chemical Company, Kingsport, Tenn.; H1000 and H1001 from Zhongde (Puyang Zhongde Petroleum Resins Co.); and HCR-R5100 and HCR-R5101 from Credrez (Puyang Tiancheng Chemical Co., Ltd.).

Rosin-based resins can include rosin acids, rosin esters, modified rosin acids, modified rosin esters or mixtures thereof with varying degrees of unsaturation. Rosin acids and rosin esters often have three fused carbon rings and also have zero, one, two, or three carbon-carbon double bonds. Examples of useful commercially available rosin esters and acids include, for example, SYLVALITE RE100 and SYLVACOTE 6101 available from Arizona Chemical, Jacksonville, Fla., PENSEL GA90, GB120 and C available from Arakawa Chemical. One or more maleic-modified rosin ester (MMRE) can be useful for some applications. Examples of useful commercially available MMREs include, for example, SYLVACOTE 4973, 7021 and 7118 available from Arizona Chemical, Jacksonville, Fla., and LEWISOL 28-M and 29-M and PENTALYN 350-M available from Eastman Chemical, Kingsport, Tenn.

The pavement marking compositions can form a hot melt extrusion roadway marking, a hot melt spray roadway marking, a hot melt hand-applied roadway marking, a preformed extruded roadway marking, an extruded roadway marking, a pavement marking tape, a pavement marking paint. A pavement marking tape can comprise a pavement marking composition, such as any of those described herein, and a tape backing. The tape backing is often flexible, although this is not required unless otherwise specified.

The pavement marking compositions can be thermoplastic pavement marking compositions. The thermoplastic pavement marking compositions described herein can be heated to form a mixture. In some embodiments, the mixture is a homogeneous mixture.

The pavement marking composition can be applied to pavement by any suitable procedure, including, for example, extrusion, flame-spraying, and coating on a web followed by application to a roadway.

For example, pavement markings can be applied to a roadway using a pavement marking application device. This can be referred to as, for example, a hot-melt extrusion process, and one exemplary hot-melt extrusion process is described in U.S. Pat. No. 3,902,666 (Sakai), which is hereby incorporated by reference in its entirety and for all purposes. Optical components may then be added to the extruded pavement marking before the material has cooled and hardened, as described in PCT Publication No. 2007/092635 (Nagaoka), which is hereby incorporated by reference in its entirety and for all purposes.

As another example, pavement markings can be applied to a roadway using a flame-spraying process. In at least some of these embodiments, the composition can be applied using commercially-available flame-spray equipment for pavement marking applications, such as the devices described in U.S. Pat. No. 3,279,336 (Eden et al.), U.S. Pat. No. 3,393,615 (Micheln), and U.S. Pat. No. 3,874,801 (White), all of which are hereby incorporated by reference in their entirety and for all purposes.

The pavement marking compositions can be used to form a marked pavement. Exemplary pavements are those made of, for example, asphalt, concrete, and bricks. The pavement marking can have a thickness of, for example, between about 0.05 cm and about 3 cm, and preferably between 0.13 and 2 mm. Pavement markings can be in the form of any desired indicia including, for example, stripes, text, graphics, and other symbols.

An article can comprise at least one of a copolymer disclosed herein, a pavement marking composition disclosed herein, a pavement marking tape disclosed herein, and a coating discussed herein. The article can be any type of article, for example, one or more of a roadway, a walkway, a bicycle path, a curb, a traffic barrier, a barricade, steps, a parking lot, a train bed, and a train platform.

Importantly, the copolymers, articles, and compositions described herein can be used in applications other than pavement markings. For example, compositions comprising at least one copolymer as described herein can be components of adhesives, top films, photovoltaic devices, for example, to adhere layers of such photovoltaic devices together, roofing materials, graphic articles, or air shields. Similarly, articles comprising at least one copolymer disclosed herein can include one or more of graphic articles, adhesives, top films, photovoltaic devices, roofing materials, and air shields.

EXAMPLES

These Examples are merely for illustrative purposes and are not meant to limit the scope of the appended claims.

Example 1

Preparation of EAA-Polydiorganosiloxane Copolymer

A mixture of 850.0 g of EAA sold under the tradename A-C 5120 (Honeywell, Morristown, N.J.), 212.5 g of 33K silicone diamine as described in U.S. Pat. No. 7,501,184, 7 drops of 85% phosphoric acid (Aldrich Chemical Company, Milwaukee, Wis.), and 246 mL of ACS grade toluene (JT Baker now Avantor Performance Materials, Center Valley, Pa.) were charged into a 4"×1 L resin flask whose resin head was equipped with an overhead mechanical stirrer, a thermocouple, and a Dean-Stark trap with a condenser. The reaction was stirred with a mechanical motor and heated using an electric heating mantle. A gentle flow of nitrogen was maintained through the head space of the flask. The reaction was allowed to reflux for 16 hours, during which time water was collected in the Dean-Stark trap. At the end of this period, the toluene was distilled off under atmospheric pressure while the temperature was slowly increased to 225° C. No further toluene distillation was observed once 225° C. was reached. The nitrogen flow was turned off and a 25 mm Hg vacuum was slowly introduced into the reactor with stirring. The reaction was held at 225° C. under 25 mm Hg vacuum for 4 hours. At the end of this period, the vacuum was broken with nitrogen and 15.9 g of Irganox 1035 (BASF, Florham Park, N.J.) were added to the reaction. The reaction was stirred for an additional 30 min and then drained into a polytetrafluoroethylene pan. Upon cooling, an EAA-silicone copolymer was collected as an opaque, odorless white solid. The acid number for the EAA-silicone copolymer was measured by titration and determined to be 1.512 meq/g and the amine number was determined to be <0.001 meq/g. This indicates that a significant amount of the silicone diamine had reacted with the A-C 5120 EAA.

Example 2

Preparation of EAA-Polydiorganosiloxane Copolymer

A mixture of 278.7 g of EAA sold under the trade name Primacor 59901 (Dow Chemical Company, Midland, Mich.), 69.7 gm of 10K silicone monoamine (prepared as described in WO 96/34030, 20% by weight of reactants), 1 drop of 85% phosphoric acid (Aldrich Chemical Company, Milwaukee, Wis.), 161 mL of ACS grade toluene (JT Baker now Avantor Performance Materials, Center Valley, Pa.) were charged into a 4"×1 L resin flask whose resin head was equipped with an overhead mechanical stirrer, a thermocouple and a Dean-Stark trap with a condenser. The reaction was stirred with a mechanical motor and was heated using an electric heating mantle. A gentle flow of nitrogen was maintained through the head space of the flask. The reaction was allowed to reflux for 16 hours during which time water was collected in the Dean-Stark trap. At the end of this period, the toluene was distilled off under atmospheric pressure and the temperature was gradually increased to 150° C. No further toluene distillation was observed once the temperature reached 150° C. The nitrogen flow was then turned off and a 100 mm Hg vacuum was slowly introduced into the reactor with stirring, causing additional toluene to be distilled. The reaction temperature was raised to 180° C. and the reaction was held under 35 mm Hg vacuum for 4 hours. The vacuum was then broken with nitrogen and 1.7 g of Irganox 1035 (BASF, Florham Park, N.J.) was added to the reaction. The reaction temperature was raised to 200° C. with stirring over 30 min, after which time the contents of the reaction flask was drained into a polytetrafluoroethylene pan. Upon cooling, an EAA-silicone copolymer was collected as an opaque, odorless white solid. The acid number for the EAA-silicone copolymer was measured by titration and determined to be 2.166 meq/g and the amine number was determined to be <0.005 meq/g. This indicates that a significant amount of the silicone diamine had reacted with the Primarcor 59901 EAA.

Example 3

Preparation of EAA-Polydiorganosiloxane Copolymer from Partially Amidated EAA

To a 1 liter reaction flask was charged dodecylamine (93.5 g, Aldrich, St. Louis, Mo.), EAA obtained under the name Primacor 59901 (192.5 g, Dow Chemical Co., Midland, Mich.), xylenes (165 mL, Univar, St. Paul, Minn.) and 85% phosphoric acid (0.61 g, Alfa Aesar, Ward Hill, Mass.). The flask was affixed to a flask head which was fitted with a thermocouple, a mechanical stirrer, and a Dean-Stark assembly. The top of the condenser on the Dean-Stark assembly was further fitted with an adapter for allowing the introduction of nitrogen gas or vacuum into the reactor. A nitrogen atmosphere was introduced, and the mixture was heated to reflux under the nitrogen atmosphere with an electric mantle while stirring at 50. Reflux was maintained for 80 hours, during which time the temperature of the contents of the flask was noted to be between 150° C. and 160° C. 7.0 mL of water was collected in the Dean-Stark trap. The nearly colorless reaction mixture was cooled to approximately 125° C. and 33 k PDMS diamine (described in U.S. Pat. No. 7,501,184) was added at once with stirring to the reaction mass. The reaction was heated to reflux under a nitrogen atmosphere for 48 hours. At the end of this time, a total of 7.8 mL of water had been collected in the Dean-Stark trap. The reaction was then cooled to 125° C. and the Dean-Stark assembly was replaced with a distillation head The distillation head was fitted with an to allow the introduction of nitrogen gas or vacuum into the reactor. Xylenes were distilled by heating the reaction mixture to 160° C. with stirring. When no further distillate was observed to evolve, the reaction mixture was placed under a 35 mm Hg vacuum at 160° C. for 3 hours with stirring. At the end of this period, the reactor was flushed with nitrogen gas and Irganox 1035 (1.7 g, BASF, Ludwigshafen, Germany) was added. Stirring under a nitrogen atmosphere was continued for 15 minutes at 160° C. after which time the EAA-silicone copolymer was collected by pouring the hot contents of the resin flask on to an aluminum tray. The EAA-silicone copolymer was allowed to cool to ambient temperature spontaneously over the period of 16 hours and was then collected as a white, opaque solid. The yield was 320 g.

Comparative Example 1

Attempted Preparation of
EAA-Polydiorganosiloxane Copolymer

A mixture of 354.8 g of EAA sold under the name Primacor 59901 (Dow Chemical Company, Midland, Mich.), 236.5 g of 33K silicone diamine (described in U.S. Pat. No. 7,501,184), 2 drops of 85% phosphoric acid (Aldrich Chemical Company, Milwaukee, Wis.), and 137 mL of ACS grade toluene (JT Baker now Avantor Performance Materials, Center Valley, Pa.) were charged into a 4"×1 L resin flask whose resin head was equipped with an overhead mechanical stirrer, a thermocouple and a Dean-Stark trap with a condenser. The reaction was stirred with a mechanical motor and was heated using an electric heating mantle. A gentle flow of nitrogen was maintained through the head space of the flask. The reaction was allowed to reflux for 16 hours when a few drops of water were collected in the Dean-Stark trap. During this time the viscosity of the reaction began to increase and eventually the reaction assumed the consistency of a silicone caulking material. The reaction had gelled and the experiment was discontinued. No product was collected.

Comparative Example 1 demonstrates the difficulty of forming EAA-silicone copolymers when using grades of EAA with a high molecular weight and high acrylic acid.

Comparative Example 2 and Examples 3-6

Pavement marking compositions were prepared by mixing the components described in Table 1. Note that Comparative Example 2 does not contain any EAA-polydiorganosiloxane copolymer, whereas each of Examples 3-6 contains the specified amount of EAA-polydiorganosiloxane copolymer.

TABLE 1

Pavement marking compositions. All quantities are in grams.

| | Comparative Example 2 | Example 3 | Example 4 | Example 5 | Example 6 |
|---|---|---|---|---|---|
| Primacor 5990I | 18.75 | 18.75 | 18.75 | 18.75 | 18.75 |
| A-C 5120 | 6.25 | 4.25 | 1.25 | 4.25 | 1.25 |
| Copolymer of Example 2 | 0 | 0 | 0 | 2 | 5 |
| Copolymer of Example 1 | 0 | 2 | 5 | 0 | 0 |
| R960 TiO2 | 10 | 10 | 10 | 10 | 10 |
| Calcium Carbonate Omya5 | 25 | 25 | 25 | 25 | 25 |
| Swarco Type 1 Glass Beads | 20 | 20 | 20 | 20 | 20 |
| Swarco Type 3 Glass Beads | 20 | 20 | 20 | 20 | 20 |
| Total Mass | 75 | 75 | 75 | 75 | 75 |

Comparative Example 3 and Examples 7-10

The compositions of Comparative Example 2 and Examples 3-6 described were molded into test samples. The test samples were tested on a Surface Analyst instrument (Brighton Technologies Group, Inc., Cincinnati, Ohio) to determine their equilibrium contact angles. The equilibrium contact angles are reported in Table.

TABLE 2

Equilibrium contact angle measurements for EAA-silicone polyamide samples.

| | Material tested | Equilibrium Contact Angle (degrees) |
|---|---|---|
| Comparative Example 3 | Comparative Example 2 | 60 |
| Example 7 | Example 3 | 69 |
| Example 8 | Example 4 | 84 |
| Example 9 | Example 5 | 65 |
| Example 10 | Example 6 | 83 |

Examples 7-10 demonstrate that it is possible to produce significant increases in the contact angle of a thermoplastic composition by incorporation of very low levels of EAA-polydiorganosiloxane copolymer. The magnitude of this effect is particularly surprising because the silicone content of the EAA-polydiorganosiloxane copolymer is only about 20%. Thus, when the copolymers described herein are used, very little polydiorganosiloxane is needed to effect a large change in contact angle.

LISTING OF EXEMPLARY EMBODIMENTS

Particular embodiments are discussed below to assist in understanding the invention, and are not to be construed as limiting. None of the particular features discussed in this list is required, unless otherwise specified.

Embodiment 1 is a copolymer comprising at least one poly(ethylene-co-acrylic acid) segment and at least one polydiorganosiloxane segment Embodiment 2 is a copolymer of embodiment 1, wherein the at least one polydiorganosiloxane segment is covalently bound to one or more acrylic acid units in the at least one poly(ethylene-co-acrylic acid) segment by an ester bond or an amide bond.

Embodiment 3 is a copolymer of embodiment 2, wherein from about 0.001 mol % and 100 mol % of the acrylic acid units in the at least one poly(ethylene-co-acrylic acid) segment are bound to a polydiorganosiloxane segment by an ester bond or an amide bond.

Embodiment 4 is a copolymer of embodiment 3, wherein from about 0.005 mol % to about 50 mol % of the acrylic acid units in the at least one poly(ethylene-co-acrylic acid) segment are bound to a polydiorganosiloxane segment by an ester or an amide bond.

Embodiment 5 is a copolymer of embodiment 4, wherein from about 0.01 mol % to about 20 mol % of the acrylic acid units in the at least one poly(ethylene-co-acrylic acid) segment are bound to a polydiorganosiloxane segment by an ester or an amide bond.

Embodiment 6 is a copolymer of any of the preceding embodiments, wherein the copolymer is the reaction product of at least one poly(ethylene-co-acrylate) of Formula (I)

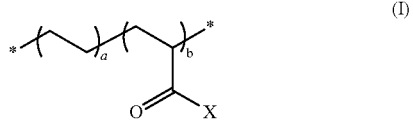

(I)

and at least one polydiorganosiloxane of Formula (II)

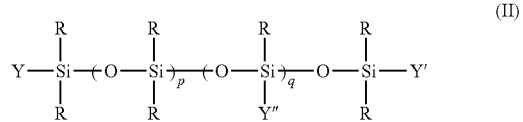

(II)

wherein:

each X is independently OH, Cl, Br, R'—NZ or R'—O, provided at least some occurrences of X are neither R'—NHZ nor R'—O, each Y, Y', and Y" is independently selected from R, G-OH, G-O(CO)R', G-NHZ, and G-NZ(CO)R', each R is independently alkyl, aryl, or aralkyl, each R' is independently alkyl, alkenyl, aryl, or aralkyl, each G is independently alkylene, arylene, or aralkylene, each Z is independently hydrogen, alkyl, aryl, or aralkyl, a and b are both greater than zero and are selected such that 28(a)+72(b) is from about 750 to about 100,000, and p is zero or greater, q is one or greater, and p and q are selected such that p+q is from 1 to about 12,000;

and further wherein:

at least one of Y, Y', and Y" is G-OH or G-NHZ, when either Y, Y', or both Y and Y' are not R then Y" is R, when Y" is not R then both Y and Y' are R.

Embodiment 7 is a copolymer of embodiment 6 wherein a and b are selected such that 28(a)+72(b) is from about 750 to about 50,000.

Embodiment 8 is a copolymer of any of embodiments 6 or 7, wherein a and b are selected such that 28(a)+72(b) is from about 750 to about 10,000.

Embodiment 9 is a copolymer of any of embodiments 6 to 8, wherein p+q is from about 5 to about 8,000.

Embodiment 10 is a copolymer of any of embodiments 6 to 9, wherein p+q is from about 10 to about 5,000.

Embodiment 11 is a copolymer of any of embodiments 6 to 10, wherein at least one R is alkyl.

Embodiment 12 is a copolymer of embodiment 11, wherein at least one R is $C_1$ to $C_{26}$ alkyl.

Embodiment 13 is a copolymer of embodiment 12, wherein at least one R is $C_1$ to $C_{16}$ alkyl.

Embodiment 14 is a copolymer of any of embodiments 10 to 13, wherein the alkyl is branched.

Embodiment 15 is a copolymer of any of embodiments 10 to 13, wherein the alkyl is linear.

Embodiment 16 is a copolymer of any of embodiments 10 to 13, wherein the alkyl is cyclic.

Embodiment 17 is a copolymer of any of embodiments 6 to 10, wherein at least one R is aryl.

Embodiment 18 is a copolymer of embodiment 17, wherein the aryl is a six-membered ring.

Embodiment 19 is a copolymer of embodiment 18, wherein the aryl is benzyl.

Embodiment 20 is a copolymer of embodiment 17, wherein the aryl is a $C_{10}$ aryl.

Embodiment 20 is a copolymer of embodiment 17, wherein the aryl is naphthyl.

Embodiment 21 is a copolymer of any of embodiments 6 to 10 wherein at least one R is aralkyl.

Embodiment 22 is a copolymer of any of embodiments 6 to 21, wherein at least one R' is alkyl.

Embodiment 23 is a copolymer of embodiment 22, wherein the alkyl is $C_1$ to $C_{22}$ alkyl.

Embodiment 24 is a copolymer of any of embodiments 6 to 21, wherein at least one R' is alkenyl.

Embodiment 25 is a copolymer of embodiment 24, wherein the alkenyl is $C_4$ to $C_{22}$ monounsaturated or polyunsaturated alkenyl.

Embodiment 26 is a copolymer of embodiment 25, wherein the alkenyl is one or more of linoleyl, oleyl, myristoyl, palmitoyl, hexadicatrienyl, eicosatrienyl, eicosapentaenyl, arachidonyl, docosadienyl, and adrenyl.

Embodiment 27 is a copolymer of any of embodiments 6 to 21, wherein R' is aralkyl.

Embodiment 28 is a copolymer of any of the preceding embodiments, wherein at least one G is alkylene.

Embodiment 29 is a copolymer of embodiment 28, wherein the alkylene is $C_1$ to $C_{22}$ alkylene.

Embodiment 30 is a copolymer of embodiment 29, wherein the alkylene is $C_1$ to $C_{16}$ alkylene.

Embodiment 31 is a copolymer of any of the preceding embodiments, wherein at least one G is arylene.

Embodiment 32 is a copolymer of any of the preceding embodiments, wherein at least one G is aralkylene.

Embodiment 33 is a copolymer of any of embodiments 6-21, wherein at least one Z is alkyl.

Embodiment 34 is a copolymer of embodiment 33, wherein the alkyl is $C_1$ to $C_{22}$ alkyl.

Embodiment 35 is a copolymer of embodiment 34, wherein the alkyl is $C_1$ to $C_{16}$ alkyl.

Embodiment 36 is a copolymer of any of embodiments 6 to 21, wherein at least one Z is aryl.

Embodiment 37 is a copolymer of embodiment 36, wherein at least one Z is aralkyl.

Embodiment 38 is a copolymer of any of embodiments 6 to 37, wherein Y" is not R.

Embodiment 39 is a copolymer of any of embodiments 6 to 38, wherein the polydiorganosiloxane has the structure of Formula (III)

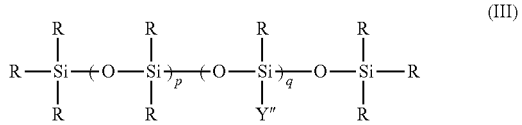

Embodiment 40 is a copolymer of any of embodiments 6 to 39, wherein the polydiorganosiloxane has structure of Formula (IV)

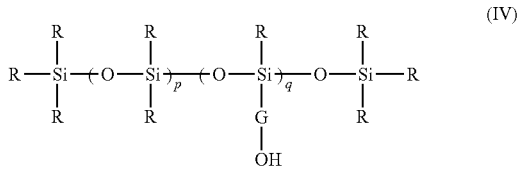

Embodiment 41 is a copolymer of any of embodiments 6 to 39, wherein the polydiorganosiloxane has the structure of

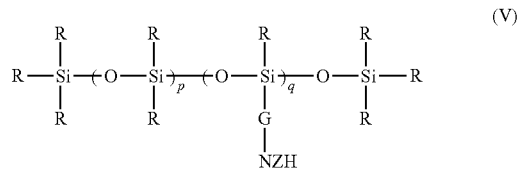

Embodiment 42 is a copolymer of any of embodiments 6 to 37, wherein Y" is R and p is zero.

Embodiment 43 is a copolymer of any of embodiments 6 to 37 or 42, wherein the polydiorganosiloxane has the structure of

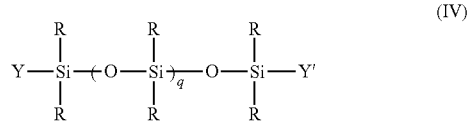

Embodiment 44 is a copolymer of embodiment 43 wherein Y is G-OH or G-NZH and Y' is R.

Embodiment 45 is a copolymer of embodiment 44 wherein Y is G-OH or G-O(CO)R'.

Embodiment 46 is a copolymer of embodiment 44 wherein Y is G-NZH or G-NZ$_2$.

Embodiment 47 is a copolymer of embodiment 43 wherein both Y and Y' are G-OH.

Embodiment 48 is a copolymer of embodiment 43 wherein Y is G-OH and Y' is G-O(CO)R'.

Embodiment 49 is a copolymer of embodiment 43 wherein both Y and Y' are G-NZH.

Embodiment 50 is a copolymer of embodiment 43 wherein Y is G-NZH and Y' is G-NZ$_2$.

Embodiment 51 is a pavement marking composition comprising a copolymer of any of the preceding claims.

Embodiment 52 is a pavement marking composition of embodiment 51, further comprising a binder.

Embodiment 53 is a pavement marking composition of embodiment 52, wherein the binder comprises a C5 hydrocarbon resin, a resin comprising one or more of at least one rosin acid, at least one rosin ester, at least one modified rosin acid, and at least one modified rosin ester.

Embodiment 54 is a pavement marking composition of any of embodiments 52 or 53, wherein the binder comprises maleic-modified rosin ester resin.

Embodiment 55 is a pavement marking composition of any of embodiments 51-54, further comprising at least one pigment.

Embodiment 56 is a pavement marking composition of embodiment 55, wherein the at least one pigment comprises one or more of a white pigment and a yellow pigment.

Embodiment 57 is a pavement marking composition of embodiment 56, wherein the white pigment comprises titanium dioxide.

Embodiment 58 is a pavement marking composition of any of embodiments 51-57, further comprising at least one filler.

Embodiment 59 is a pavement marking composition of embodiment 58, wherein the filler comprises calcium carbonate.

Embodiment 60 is a pavement marking composition of any of embodiments 51-59, further comprising one or more optical materials.

Embodiment 61 is a pavement marking composition of any of embodiments 51-60, further comprising poly(ethylene-co-acrylic acid).

Embodiment 62 is a pavement marking composition of any of embodiments 51-61, further comprising a plurality of glass beads.

Embodiment 63 is a pavement marking tape comprising the pavement marking composition of any of claims 51-62.

Embodiment 64 is a coating comprising a copolymer of any one of claims 1-50.

Embodiment 65 is the coating of embodiment 64, wherein the coating is in contact with one or more substrates selected from a roadway, a walkway, a bicycle path, a curb, a traffic barrier, a barricade, steps, a parking lot, a train bed, and a train platform.

Embodiment 66 is an article comprising a copolymer of any of embodiments 1-50, a pavement marking composition of any of embodiments 51-62, a tape of embodiment 63, or a coating of any of embodiments 64-65.

Embodiment 67 is an article of embodiment 66, wherein the article comprises one or more of a roadway, a walkway, a bicycle path, a curb, a traffic barrier, a barricade, steps, a parking lot, a train bed, and a train platform.

Embodiment 68 is an article of embodiment 66, wherein the article comprises one or more of a graphic article, an adhesive, a top film, a photovoltaic device, a roofing material, and an air shield.

Modifications may take on various forms and alterations without departing from the spirit and scope of the disclosure. For example, while copolymers having particular chemical structures are described to illustrate certain aspects of the disclosure, other copolymers as disclosed herein can also be used. Accordingly, it is to be understood that the embodiments of the present disclosure are not to be limited to the particular features disclosed, but is instead controlled by the appended claims and any equivalents thereof.

What is claimed is:
1. A composition comprising:
a) a poly(ethylene-co-acrylic acid) copolymer and
b) 0.1 to 10 wt. % of the functional copolymer of a functional copolymer comprising a poly(ethylene-co-acrylic acid) segment and a covalently bound polydiorganosiloxane segment.

2. The composition of claim 1 comprising 1 to 7 wt. % of the functional copolymer.

3. The composition of claim 1 wherein from 0.001 mol % to 100 mol % of the acrylic acid units in the poly(ethylene-co-acrylic acid) segment are bound to a polydiorganosiloxane segment of the functional copolymer by an ester bond or an amide bond.

4. The composition of claim 1, wherein from about 0.005 mol % to about 50 mol % of the acrylic acid units in the poly(ethylene-co-acrylic acid) segment are bound to a polydiorganosiloxane segment by an ester or an amide bond.

5. The composition of claim 1, wherein the functional copolymer is the reaction product of poly(ethylene-co-acrylate) of Formula (I)

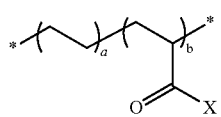

(I)

and polydiorganosiloxane of Formula (II)

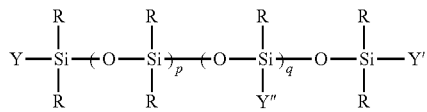

(II)

wherein:
each X is independently OH, Cl, Br, R'—NZ or R'—CO, provided at least some occurrences of X are neither R'—NHZ nor R'—CO,
each Y, Y', and Y" is independently selected from R, G-OH, G-O(CO)R', G-NHZ, and G-NZ(CO)R',
each R is independently alkyl, aryl, or aralkyl,
each G is independently alkylene, arylene, or aralkylene,
each Z is independently hydrogen, alkyl, aryl, or aralkyl,
a and b are both greater than zero and are selected such that 28(a)+72(b) is from about 1,000 to about 100,000, and
p is zero or greater,
q is one or greater, and
p and q are selected such that p+q is from 1 to about 12,000;
and further wherein:
of Y, Y', and Y" is G-OH or G-NHZ,
when either Y, Y', or both Y and Y' are not R then Y" is R,
when Y" is not R then both Y and Y' are R.

6. The composition of claim 5, wherein the polydiorganosiloxane has the structure of Formula (III)

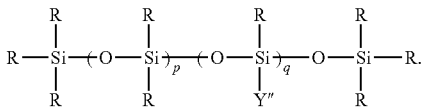

(III)

7. The composition of claim 5, wherein the polydiorganosiloxane has structure of Formula (IV)

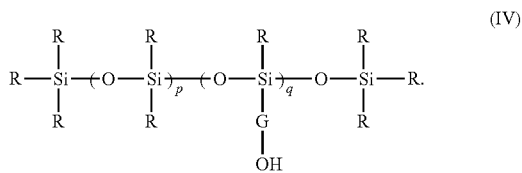

(IV)

8. The composition of claim 5, wherein the polydiorganosiloxane has the structure of

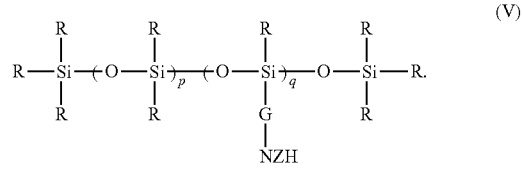

(V)

9. The composition of claim 5, wherein Y" is R and p is zero.

10. The composition of claim 5 wherein the polydiorganosiloxane has the structure of

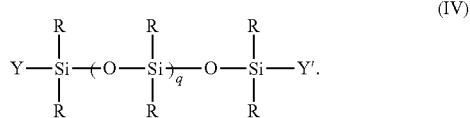

(IV)

11. The composition of claim 10 wherein Y is G-OH or G-NZH and Y' is R.

12. The composition of claim 10 wherein Y is G-OH or G-O(CO)R'.

13. The composition of claim 10 wherein Y is G-NZH or G-NZ$_2$.

14. The composition of claim 5 wherein both Y and Y' are G-OH.

15. The composition of claim 5 wherein Y is OH and Y' is OR'.

16. The composition of claim 5 wherein both Y and Y' are NZH.

17. The composition of claim 5 wherein Y is NZH and Y' is NZ$_2$.

18. The composition of claim 1 further comprising ceramic or transparent microspheres.

19. The composition of claim 1 further comprising a plasticizer in amounts of 0.1 to 4 wt. %.

20. The composition of claim 1 further comprising a wax in amounts of 1 to 5 wt. %.

21. The composition of claim 1 further comprising a dye, pigment of whitening agent.

22. The composition of claim 1 further comprising a C5 hydrocarbon resin in amounts of 5 to 20 wt.

* * * * *